United States Patent [19]

Tanaka et al.

[11] Patent Number: 4,880,084
[45] Date of Patent: Nov. 14, 1989

[54] MECHANICAL LINEAR LOCK WITH REDUNDANT LOCKING FEATURE

[75] Inventors: Akira Tanaka, Encino; Jimmy C.-M. Lee, Simi Valley, both of Calif.

[73] Assignee: P. L. Porter Company, Woodland Hills, Calif.

[21] Appl. No.: 214,166

[22] Filed: Jul. 5, 1988

[51] Int. Cl.⁴ .............................................. B65H 59/10
[52] U.S. Cl. ...................................... 188/67; 188/265; 297/374
[58] Field of Search ........................ 188/67, 68, 69, 65; 74/531, 529, 527; 81/139; 297/375, 374

[56] References Cited

U.S. PATENT DOCUMENTS

| 743,770 | 11/1903 | Talbert | 81/139 |
|---|---|---|---|
| 2,041,065 | 5/1936 | Hemphill | 188/67 |
| 4,411,339 | 10/1983 | Porter | 188/67 |
| 4,577,730 | 3/1986 | Porter | 297/375 |
| 4,685,734 | 8/1987 | Brandoli | 297/375 |

Primary Examiner—Andres Kashnikow
Assistant Examiner—Mark T. Le
Attorney, Agent, or Firm—Beehler & Pavit

[57] ABSTRACT

A linear friction lock mechanism of the type having a rod axially translatable through a lock housing, at least one locking coil spring axially fixed to the housing and having an inner coil diameter such that the coil spring normally grips the rod against such axial movement, and a lock release mechanism actuatable for unwinding the locking coil spring thereby to free the rod for movement through the housing. This linear lock is improved by providing a backup latch element mounted to the housing and spring loaded towards interlocking engagement with the rod redundantly holds the rod against axial movement through the lock housing independently of the locking coil spring to eliminate creeping of the rod through the spring. Manual and remote cable release mechanisms are optional.

19 Claims, 2 Drawing Sheets

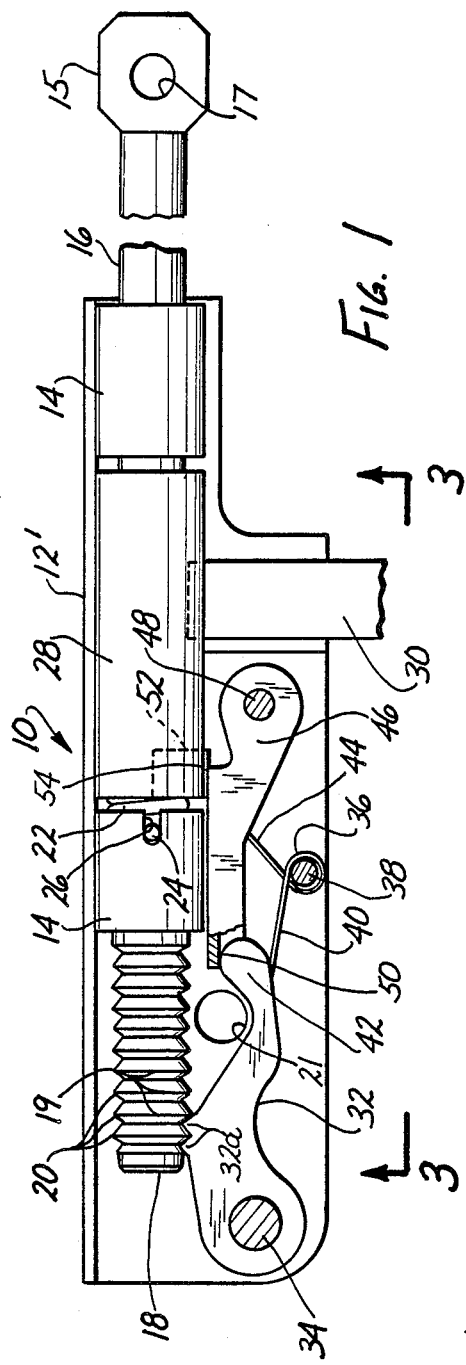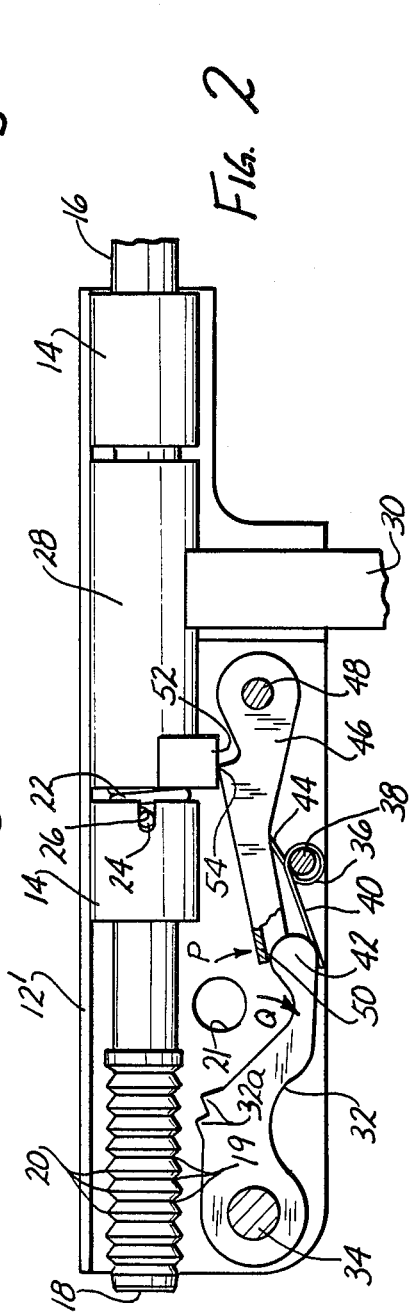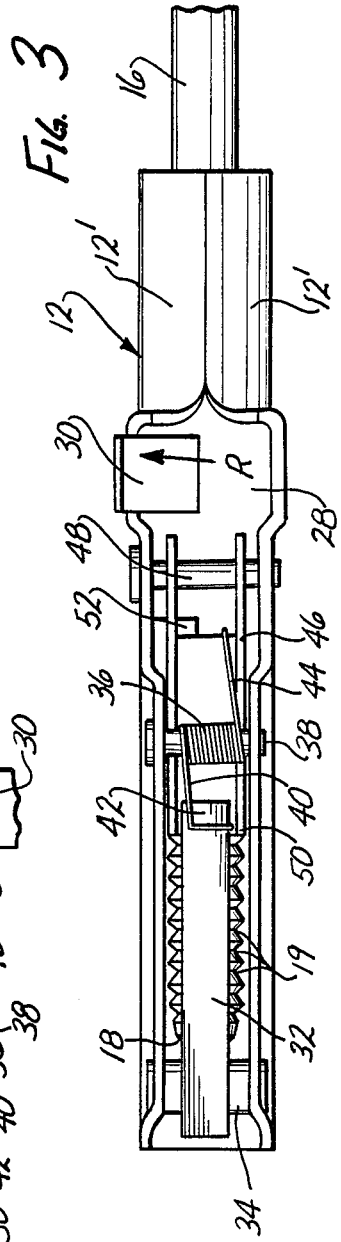

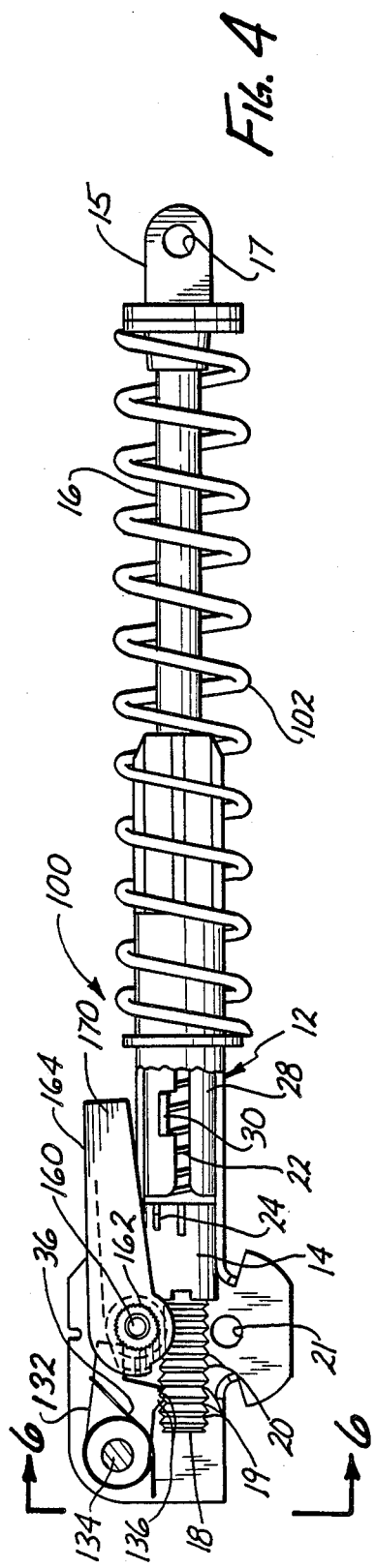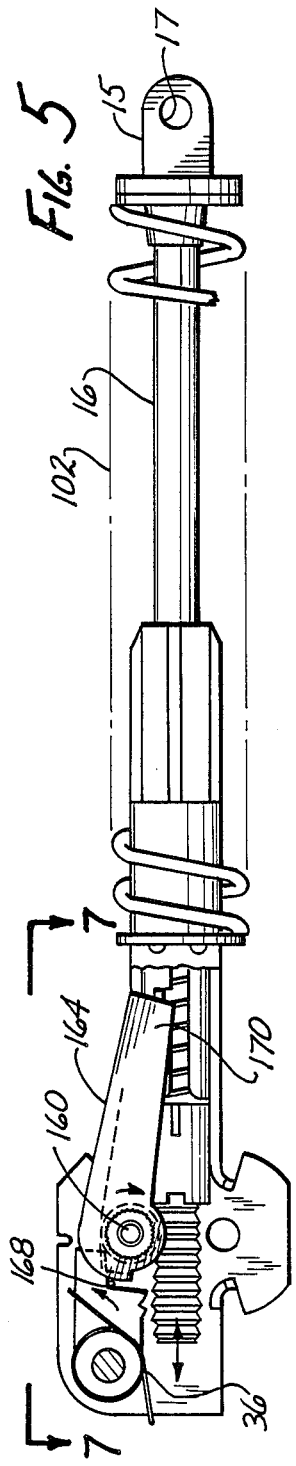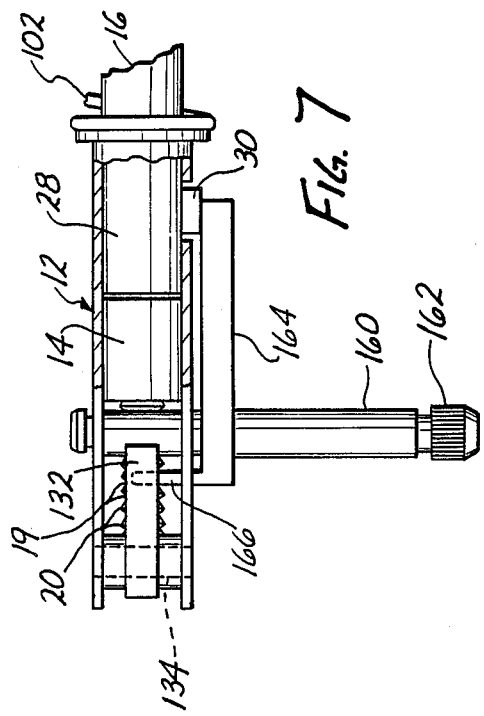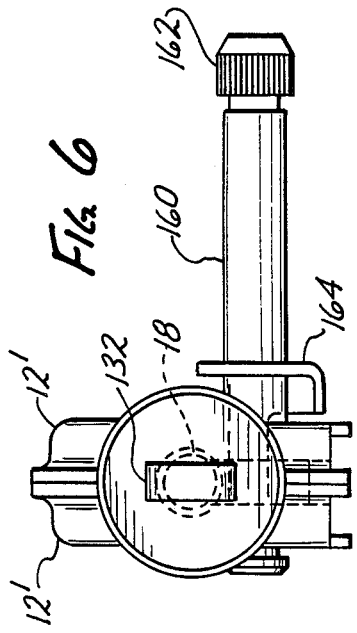

MECHANICAL LINEAR LOCK WITH REDUNDANT LOCKING FEATURE

BACKGROUND OF THE INVENTION

1. FIELD OF THE INVENTION

The present invention pertains to the field of mechanical locking devices, particularly of the type wherein a rod is axially translatable through a lock housing and having one or more coil springs normally gripping the rod and locking the same to the housing, the rod being releasable by unwinding the coil spring.

2. STATE OF THE PRIOR ART

Considerable inventive activity has been directed towards developing and improving linear friction lock mechanisms. These devices are characterized b one or more coil springs coaxial to the rod. One end of the coil spring is fixed in relation to the lock housing while the opposite end is engaged to a bushing rotatable about the rod. In a normal state the coil spring has an inner diameter somewhat smaller than the rod diameter and thus firmly grips the rod in a friction lock to prevent relative movement of the rod through the housing. A release lever is actuatable, manually or otherwise, for turning the rotatable bushing to momentarily unwinding the coil spring to increase its inside diameter and free the rod for axial translation through the housing. When the release lever is released the coil spring returns to its normal, rod gripping state. An example of a single coil spring friction lock is shown in commonly owned U.S. Pat. No. 4,411,339 issued to Porter on Oct. 25, 1983. Friction locks have found widespread application in adjustable vehicle seat installations. For example, the driver's seat in an automobile is mounted for sliding movement towards and away from the steering wheel on a pair of mounting rails and the seat is normally locked to one of the rails by means of such a friction lock mechanism. When adjustment of the seat is desired, the occupant of the seat manually actuates the release lever, moves the seat to the new desired position and releases the lock lever to secure the seat in the new position.

It has been found that while such locks are generally capable of reliable performance, under certain circumstances the rod may creep through the housing even while being gripped by the locking coil spring. This may happen for example, under conditions of severe vibration or other circumstances where a high axial load is repeatedly applied to the rod. This occurs in single coil locks because there is an inherent degree of asymmetry in the gripping action of the spring which is unwound only at one end. Efforts have been made to overcome this difficulty by providing dual spring lock mechanisms such as disclosed in commonly owned U.S. Pat. No. 4,577,730 issued to Porter on Mar. 25, 1986.

Nevertheless, a continuing need exists for improved linear friction lock mechanisms having positive rod locking characteristics under severe vibration or intermittent load conditions. In particular, there is a need for simple, relatively compact single coil spring friction locks featuring positive fail-safe redundant locking for securing the rod against creep through the coil spring and also to hold the rod in the event of structural failure of the coil spring. Such a redundant lock should be of simple and economical construction, and of uncomplicated operation.

SUMMARY OF THE INVENTION

This invention addresses the aforementioned need by providing a linear friction lock mechanism of the type having a rod axially translatable through a lock housing, at least one locking coil spring axially fixed to the housing and having an inner coil diameter such that the coil spring normally grips the rod against such axial movement, and a lock release mechanism actuatable for unwinding the locking coil spring thereby to free the rod for movement through the housing. This linear lock is improved by providing a backup latch element mounted to the housing for movement towards or away from interlocking engagement with the rod. The backup latch is spring loaded towards interlocking engagement with the rod and normally holds the rod against axial movement through the lock housing.

In a first embodiment of the invention a backup release arrangement is connected between the backup latch and the coil spring release mechanism so that actuation of the coil spring release mechanism simultaneously operates to disengage the backup latch, thus freeing the rod for axial movement through the lock housing. Conversely, when the coil spring release lever is released to allow the coil spring to wind and again grip the rod, the backup latch mechanism is also thereby returned to a rod engaging condition in which the spring and the backup latch cooperate to secure the rod in place relative to the lock housing.

Specifically, the locking spring is held between a fixed nonrotatable bushing and a sleeve rotatable for unwinding the locking coil and releasing its friction grip on the rod. The rotatable sleeve is provided with a cam element which operates through a cam follower arrangement to disengage the backup latch upon rotation of this sleeve, such that both the locking coil and backup latch can be released by actuation of a single lock release lever.

The cam follower arrangement includes a backup release lever pivoted to the lock housing with a cam follower edge spring biased into camming engagement with the cam element and a free end acting to disengage the backup latch upon rotation of the rotatable sleeve. A single bias spring having two end tangs may be arranged to bias both the backup latch and the backup release lever. The lock housing is advantageously formed of two opposite halves held together by welding to a pair of fixed bushings through which slides the rod.

In a second embodiment of the invention the aforedescribed camming arrangement is replaced by a single lever fixed externally to the housing on a spindle which is mounted for rotation to the lock housing transversely to the rod. The end of the spindle is normally provided with a suitable handle by means of which the spindle is turned by an operator in order to release the lock from its normally locked condition. The lever is provided with a finger extending parallel to the spindle axis through a window in the lock housing and into engagement with the backup latch element. A generally diametrically opposite portion of the release lever is movable into engagement with a coil spring release lever fixed to the rotatable sleeve. The relative arrangement is such that upon rotation of the spindle from its normal to a release position the finger on the release lever first moves the backup latch away from engagement with the rod and maintains the release latch in disengaged condition. Upon further rotation of the spindle an arm generally diametrically opposite to the finger on the main release lever engages against the coil spring release lever to move the spring release lever from its normally locked to a coil unwinding position whereupon the rod is completely freed from both the coil spring and backup latch for axial movement through the lock housing.

BRIEF DESCRIPTION OF THE DRAWINGS

FIG. 1 is a longitudinal section of the improved lock of this invention shown in its normal redundantly locked condition;

FIG. 2 is a longitudinal section as in FIG. 1 showing the lock in fully released condition and the rod shown displaced axially to the left of its FIG. 1 position;

FIG. 3 is a longitudinal perspective view of the lock seen along arrows 3—3 in FIG. 1;

FIG. 4 is a longitudinal view with the lock housing partly broken away to expose the backup latch and main release lever arrangement shown in normal redundantly locked condition;

FIG. 5 is a view as in FIG. 4 with the backup latch in released condition and the main release lever just prior to engaging the coil spring release lever;

FIG. 6 is an axial section of the lock taken along line 6—6 in FIG. 4;

FIG. 7 is a partial longitudinal view with the housing partly broken away taken along arrows 7—7 in FIG. 5.

DETAILED DESCRIPTION OF THE PREFERRED EMBODIMENTS

With reference to the drawings, FIG. 1 shows a first embodiment of the improved mechanical lock 10. A clam-shell type lock housing 12 consists of two opposite halves 12' only one of which is seen in FIG. 1 and are seen joined together in FIG. 3. A rod 16 is slidable through two fixed, nonrotatable bushings 14 disposed between and spot welded to the two housing halves 12' so as to secure and hold together the housing halves. For mounting purposes, a first mounting hole 17 is provided in the rod 16 and a second mounting hole 21 is provided in each of the two halves of the lock housing 12. The rod 16 is axially movable through the housing 12 and both fixed bushings 14. A first mounting hole 17 is provided in the rod 16 and a second mounting hole 21 is provided in each of the two halves of the lock housing 12. The rod 16 has an end 18 serrated by a number of parallel circumferential V-grooves 19 between which are defined circumferential teeth 20. A locking coil spring 22 is wound about the rod 16 and has a normal inner diameter slightly smaller than the diameter of the rod 16 such that the spring 22 normally grips the rod 16 in tight frictional engagement. Most of the spring 22 is contained within tubular rotatable sleeve 28 which is rotatable about the rod 16 within the lock housing 12. The spring 22 terminates at each end in radial tangs 24. One tang 24 is visible in the drawings and is captive within a radial slot 26 in one fixed bushing 14. The opposite end of the spring 22 lies within the hollow cylindrical rotatable sleeve 28 and also terminates in an end tang at that end which is likewise radially engaged to the rotatable sleeve 28 in a conventional manner. The locking coil spring 22 can be unwound by turning the rotatable sleeve 28 in response to force applied to lock release lever 30 so as to increase the spring inner diameter and release its grip on the rod 16 which then becomes free to move axially through bushings 14, rotatable sleeve 28 and the housing 12.

A backup latch pawl 32 is pivoted on a shaft 34 supported between the two housing halves 12. The latch 32 is movable between a rod engaging condition shown in FIG. 1 and a disengaged condition seen in FIG. 2. The pawl 32 has a pair of pawl teeth 32a configured to mate with the V-grooves 19 in rod 16. In a normal, locked condition of the device, the latch pawl is biased by tang 40 of bias spring 36 into interlocking engagement with rod 16 by engagement of the pawl teeth 32a with the rod grooves 19 as shown in FIG. 1. A pawl release lever 46 is pivoted on shaft 48 and is held under the urging of tang 44 of the single bias spring 36 with cam follower edge 54 against a camming lobe 52 formed on the exterior surface of the tubular bushing 28. In a normal locked condition of the device 10 as shown in FIG. 1, the cam lobe 52 presents a minimum diameter portion towards the cam follower edge 54 allowing the backup latch pawl 32 to engage and interlock with the rod 16 under the urging of tang 40 of the same bias spring 36. In this normal locked condition of the device 10, both the locking coil spring 22 and backup latch 32 cooperate in holding the rod 16 against axial movement through the housing 12.

As the rotatable sleeve 28 is turned by actuation of the lever 30 in the direction of arrow R in FIG. 3, the radial dimension of the cam lobe 52 bearing against the cam follower edge 54 of the pawl release lever 46 gradually increases, pushing the pawl release lever 46 counter-clockwise about pivot 48 as indicated by arrow P in FIG. 2 such that its free end 50 acts against the end 42 of the latch 32, turning the latch clockwise about pivot 34 as indicated by arrow Q and lifting the latch teeth 32a away from the grooves 19 to disengage the backup latch 32. Upon further rotation of the sleeve 28 the locking coil 22 is unwound by rotation of the sleeve 28, so that rod 16 is freed for axial movement through housing 12 and remains in such free state as the lock release lever 30 is held in the rod releasing position shown in FIGS. 2 and 3 against the tendency of the locking spring 22 to return to its normal state of reduced diameter.

A second embodiment of this invention is shown in FIGS. 4 through 7 in which the lock 100 is similar to the lock 10 of FIGS. 1-3 in that it incorporates a rod 16 axially movable through a lock housing 12 assembled from two opposite halves 12'0 best seen in FIG. 6. The rod 16 moves through two fixed nonrotatable bushings 14, only one of which is visible in FIG. 4, the other being hidden under the unbroken portion of the housing 12. A locking coil spring 22 is wound on the rod 16 axially between the two bushings 14 and normally tightly grips the rod 16 so as to hold it against axial translation through the housing and bushings. The coil 22 ends in two opposite tangs, one of which is engaged to the visible fixed bushing 14, the opposite tang being secured to rotatable tubular sleeve 28 to which is fixed a radially projecting coil release lever 30. Upon rotation of the hollow cyindrical rotatable sleeve 28, the spring 22 is unwound at one end and its inner diameter enlarged so as to release its grip on rod 16, freeing the latter for relative axial movement.

Elements common to both locks 100 and 10 are designated by like numerals in the drawings. The lock of FIG. 4 is shown with an expansion spring 102 compressed between the housing 12 and the end 15 of the rod 16. The spring 102 drives the rod 16 to maximum extension from the lock housing upon release of the lock mechanism. Provision of such an extension spring is optional depending on the particular application of the lock mechanism and a similar extension spring arrangement may be provided in the lock 10 of FIGS. 1–3.

The lock 100 is provided with a redundant locking mechanism which includes a backup locking latch 132 pivotable on transverse shaft 134 between a locking position wherein latch teeth 136 are in mating engagement with V-grooves 19 defined between circumferential teeth 20 in the rod 16 near the rod end 18 as in FIG. 1 and a released position where the latch teeth 136 are spaced from the rod 16 as in FIG. 2. The latch 132 is normally spring driven into locking engagement with the serrated end of the rod 16 in the condition shown in FIG. 1.

A spindle 160 is mounted for rotation to the housing 12 transversely to the rod 18 and has a free outer end 162 on which will normally be mounted a lock release handle or knob of appropriate size for easy operation. Mounted transversely on the spindle 160 is a main release lever 164 as best understood by reference to FIGS. 6 and 7. The lever 164 is rotatable with the release spindle 160 and the lever includes a latch release finger 166 projecting through a window into the lock housing between the rod 16 and the free radially outer end of the backup latch 132. Upon clockwise rotation of the spindle 160 as suggested in FIG. 5, the end of the finger 166 makes contact against the edge 168 of backup latch, pivoting the same counterclockwise away from engagement with the serrations on the rod 16. Upon further rotation of the spindle 160, the elongated arm 170 of the lever makes contact with the free end of the coil release lever 30 and moves the lever 30 to its coil releasing position, the levers 164 and 30 moving in circular paths which lie in mutually perpendicular planes. The finger 166 maintains the backup latch 132 disengaged from the rod 16 throughout the additional arc of spindle rotation necessary to actuate the coil release lever 30. The main release lever 164 is constructed so as to first disengage the backup latch 132 following a relatively small angle of rotation and before releasing the locking coil 22 so as to avoid transmitting the axial loading of spring 102 or other load on the rod 16 onto the backup latch 132 prior to disengagement.

While particular embodiments of the invention have been shown and illustrated by way of example and for purposes of clarity, it must be understood that many changes, substitutions and modifications to these embodiments will become apparent to those possessed of ordinary skill in the art without thereby departing from the scope of this invention which is defined only by the following claims.

What is claimed is:

1. In a fail-safe latch for a linear mechanical lock of the type having a rod axially translatable through a lock housing, coil spring means fixed to the housing and normally gripping the rod against such axial movement and release means actuatable for unwinding the coil spring thereby to free the rod for said axial movement, the improvement comprising:
    a transversely grooved section on said rod;
    toothed latch means mounted to said housing for movement towards and away from engagement with said grooved rod section;
    means normally urging said latch means towards positive engagement with said rod thereby to lock said rod to said housing even in the event of failure of said coil spring; and
    lever means operatively connected for first disengaging said latch means upon actuation of said release means before unwinding said coil spring thereby to free said rod.

2. In a fail-safe latch for a linear mechanical lock of the type having a rod axially translatable through a lock housing, a coil spring normally gripping the rod against such axial movement and lock release means actuatable for unwinding the coil spring thereby to free the rod for said axial movement, the improvement comprising:
    back-up latch means mounted for movement towards and away interlocking engagement between said rod and said housing;
    first means normally urging said latch means towards said interlocking engagement thereby to hold said rod against said axial movement independently of said coil spring; and
    second means operatively connected for first disengaging said latch means upon actuation of said lock release means before unwinding said coil spring thereby to free said rod.

3. The improvement of claim 2 further comprising sleeve means rotatable about said rod unwinding said coil spring responsive to actuation of said lock release means wherein said second means comprise cam means associated with said rotatable sleeve configured, arranged and connected for disengaging said back-up latch means upon rotation of said sleeve to a rod releasing position.

4. The improvement of claim 3 wherein said second means further comprises backup release lever means movable by said cam means for disengaging said backup latch means.

5. The improvement of claim 4 wherein said first means is a latch loading spring mounted to said lock housing having a first end tang urging said latch into engagement with said rod and a second end tang urging said backup release lever into camming engagement with said rotatable sleeve.

6. The improvement of claim 5 wherein said backup means is pivoted to said housing and is toothed for engagement with a grooved section of said rod.

7. The improvement of claim 2 wherein said rod is slidable through fixed bushing means and wherein said lock housing substantially consists of two opposite halves held together by welding to said fixed bushing means.

8. In a fail-safe latch for a linear mechanical lock of the type having a rod axially translatable through a lock housing, a coil spring normally gripping the rod against such axial movement, sleeve means rotatable about said rod for unwinding said coil spring responsive to actuation of lock release means thereby to free the rod for said axial movement, the improvement comprising:
    back-up latch means including a toothed pawl pivoted to said housing for movement towards and away from interlocking engagement with a grooved section of said rod;
    spring means normally urging said latch means towards said interlocking engagement thereby to hold said rod against said axial movement independently of said coil spring; and
    cam means on said rotatable sleeve and cam follower means operative for disengaging said backup latch means from said rod upon rotation of said sleeve to a rod releasing position.

9. The improvement of claim 8 wherein said rod is slidable through fixed bushing means and wherein said lock housing substantially consists of two opposite halves held together by welding to said fixed bushing means.

10. In a fail-safe latch for a linear mechanical lock of the type having a rod axially translatable through a lock housing, a coil spring normally gripping the rod against such axial movement, sleeve means rotatable about said rod for unwinding said coil spring responsive to actuation of lock release means thereby to free the rod for said axial movement, the improvement comprising:
   back-up latch means mounted for movement towards and away from interlocking engagement between said rod and said housing;
   cam means on said rotatable sleeve;
   cam follower means arranged and connected for disengaging said back-up latch means upon rotation of said sleeve to a rod releasing position; and
   a loading coil spring having two end tangs, one said tang urging said back-up latch means towards engagement with said rod, thereby to hold said rod against said axial movement independently of said coil spring, the other of said tangs urging said cam follower means into camming relationship with said cam means.

11. The improvement of claim 10 wherein said cam follower means is a backup latch release lever pivoted to said housing and having a cam follower edge, a free end of said backup latch release lever disengaging said backup latch from said rod upon rotation of said rotatable sleeve to a rod releasing position.

12. In a fail-safe latch for a linear mechanical lock of the type having a rod axially translatable through a lock housing, a coil spring normally gripping the rod against such axial movement, sleeve means rotatable about said rod for unwinding said coil spring responsive to actuation of lock release means thereby to free the rod for said axial movement, the improvement comprising:
   back-up latch means normally engaging said rod for holding said rod against movement through said housing independently of said coil spring; and
   backup release means responsive to rotation of said rotatable sleeve for first disengaging said backup latch means prior to unwinding said coil spring.

13. In a fail-safe latch for a linear mechanical lock of the type having a rod axially translatable through a lock housing, a coil spring normally gripping the rod against such axial movement, sleeve means rotatable about said rod for unwinding said coil spring responsive to actuation of lock release means thereby to free the rod for axial movement, the improvement comprising:
   back-up latch means normally engaging said rod for holding said rod against movement through said housing independently of said coil spring;
   a spindle on said housing rotatable transversely to said rod;
   a lever on said spindle including first means for first disengaging said latch means upon rotation of said spindle to a first position and second means operative for unwinding said coil spring upon further rotation of said spindle.

14. The improvement of claim 13 wherein said lever is mounted externally to said lock housing.

15. The improvement of claim 14 wherein said first means extend into said housing through a window in said lock housing.

16. The improvement of claim 13 wherein said second means is operative for rotating said rotatable sleeve means upon said further spindle rotation.

17. In a fail-safe latch for a linear mechanical lock of the type having a rod axially translatable through a lock housing, coil spring means fixed to the housing and normally gripping the rod against such axial movement and coil release means actuatable for unwinding the coil spring thereby to free the rod for said axial movement, the improvement comprising:
   a transversely grooved section on said rod;
   toothed latch means mounted to said housing for movement towards and away from engagement with said grooved rod section;
   means normally urging said latch means towards positive engagement with said rod thereby to lock said rod to said housing even in the event of failure of said coil spring; and
   main lever means rotatable on said lock housing to a first position for first disengaging said latch means and for then actuating said coil release means upon further rotation of said main lever means thereby to free said rod.

18. The improvement of claim 17 wherein said lock coil release means includes sleeve means rotatable for unwinding the coil spring and radial lever means fixed to said sleeve, said main lever means engaging said radial lever means upon said further rotation to thereby rotate said sleeve means and free said rod.

19. In a fail-safe latch for a linear mechanical lock of the type having a rod axially translatable through a lock housing, coil spring means fixed to the housing and normally gripping the rod against such axial movement, sleeve means rotatable about said rod, and a first lever fixed to said sleeve, the improvement comprising:
   a transversely grooved section on said rod;
   toothed latch means mounted to said housing for movement towards and away from engagement with said grooved rod section;
   means normally urging said latch means towards positive engagement with said rod thereby to lock said rod to said housing even in the event of failure of said coil spring;
   a rotatable spindle on said housing transversely to said rod; and
   a second lever on said spindle mounted externally to said lock housing including first means for first disengaging said latch means upon rotation of said spindle to a first position, and second means operative for rotating said rotatable sleeve means upon further spindle rotation.

* * * * *